United States Patent
Tsai (10) Patent No.: US 9,423,071 B2
(45) Date of Patent: Aug. 23, 2016

(54) LOCK FOR A WALL HANGING ELECTRONIC DEVICE

(71) Applicant: HON HAI PRECISION INDUSTRY CO., LTD., New Taipei (TW)

(72) Inventor: Ming-Chun Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 46 days.

(21) Appl. No.: 14/500,205

(22) Filed: Sep. 29, 2014

(65) Prior Publication Data

US 2015/0265073 A1 Sep. 24, 2015

(51) Int. Cl.
| | |
|---|---|
| *A47B 96/06* | (2006.01) |
| *F16M 13/02* | (2006.01) |
| *E05B 73/00* | (2006.01) |
| *F16M 11/04* | (2006.01) |
| *A47G 1/16* | (2006.01) |

(52) U.S. Cl.
CPC ............... *F16M 13/02* (2013.01); *E05B 73/00* (2013.01); *F16M 11/041* (2013.01); *A47G 1/162* (2013.01); *F16M 2200/02* (2013.01)

(58) Field of Classification Search
USPC ................. 248/220.21, 222.14, 231.91, 466, 248/475.1, 476, 479, 497, 498, 323, 324, 248/917
See application file for complete search history.

(56) References Cited

U.S. PATENT DOCUMENTS

| | | | | |
|---|---|---|---|---|
| 7,611,109 B2* | 11/2009 | Lin | ........................ | F16M 13/02 248/222.52 |
| 8,020,821 B2* | 9/2011 | Chen | ...................... | F16M 11/16 248/220.22 |
| 9,010,707 B2* | 4/2015 | In | .......................... | A47G 1/164 248/295.11 |
| 9,057,479 B2* | 6/2015 | Lee | ....................... | F16M 13/022 |
| 2005/0279898 A1 | 12/2005 | Sweere et al. | | |
| 2007/0097617 A1* | 5/2007 | Searby | ................... | F16M 11/04 361/679.4 |
| 2013/0135842 A1* | 5/2013 | Kuan | ................... | H05K 5/0204 361/825 |

FOREIGN PATENT DOCUMENTS

| | | |
|---|---|---|
| CN | 201774761 | 3/2011 |
| CN | 201774761 U | 3/2011 |
| CN | 201995235 | 9/2011 |
| CN | 201995235 U | 9/2011 |
| TW | M396574 U1 | 1/2011 |
| TW | M416300 U1 | 11/2011 |
| TW | M417756 U1 | 12/2011 |

* cited by examiner

*Primary Examiner* — Steven Marsh
(74) *Attorney, Agent, or Firm* — ScienBiziP, P.C.

(57) ABSTRACT

An electronic device which can be hung on a fixing member includes an enclosure and a wall hanging lock. The wall hanging lock includes a locking frame. The locking frame includes a pair of positioning legs and a pair of locking members. The positioning legs are inserted into the locking members to engage the locking members with each other to clamp onto the fixing member. The positioning legs can also be detached from the locking members to enable the locking members to disengage from each other to allow separation of the locking members from the fixing member.

18 Claims, 8 Drawing Sheets

LOCK FOR A WALL HANGING ELECTRONIC DEVICE

FIELD

The present disclosure relates to electronic devices, and more particularly to securing wall-mounted electronic device.

BACKGROUND

Some electronic devices such as displays are hung on walls. In detail, the electronic device defines holes/slots to allow screws or hooks fixed on the wall to be inserted, therefore, the electronic device is hung on the wall.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like reference numerals indicate the same or similar elements. It should be noted that references to "an" or "one" embodiment in this disclosure are not necessarily to the same embodiment, and such references can mean "at least one."

Figure 1:
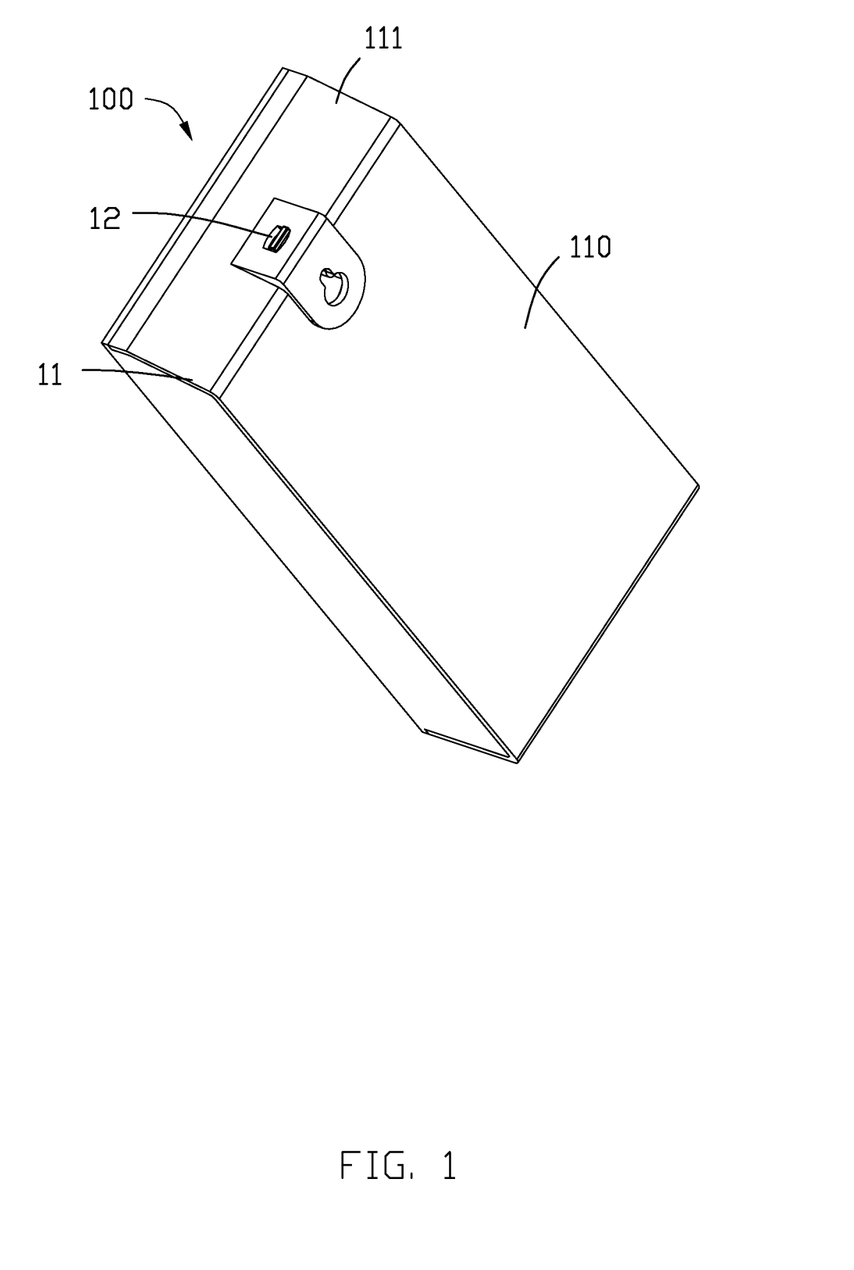
FIG. 1 is an isometric view of an embodiment of an electronic device with a wall hanging lock.
Figure 2:
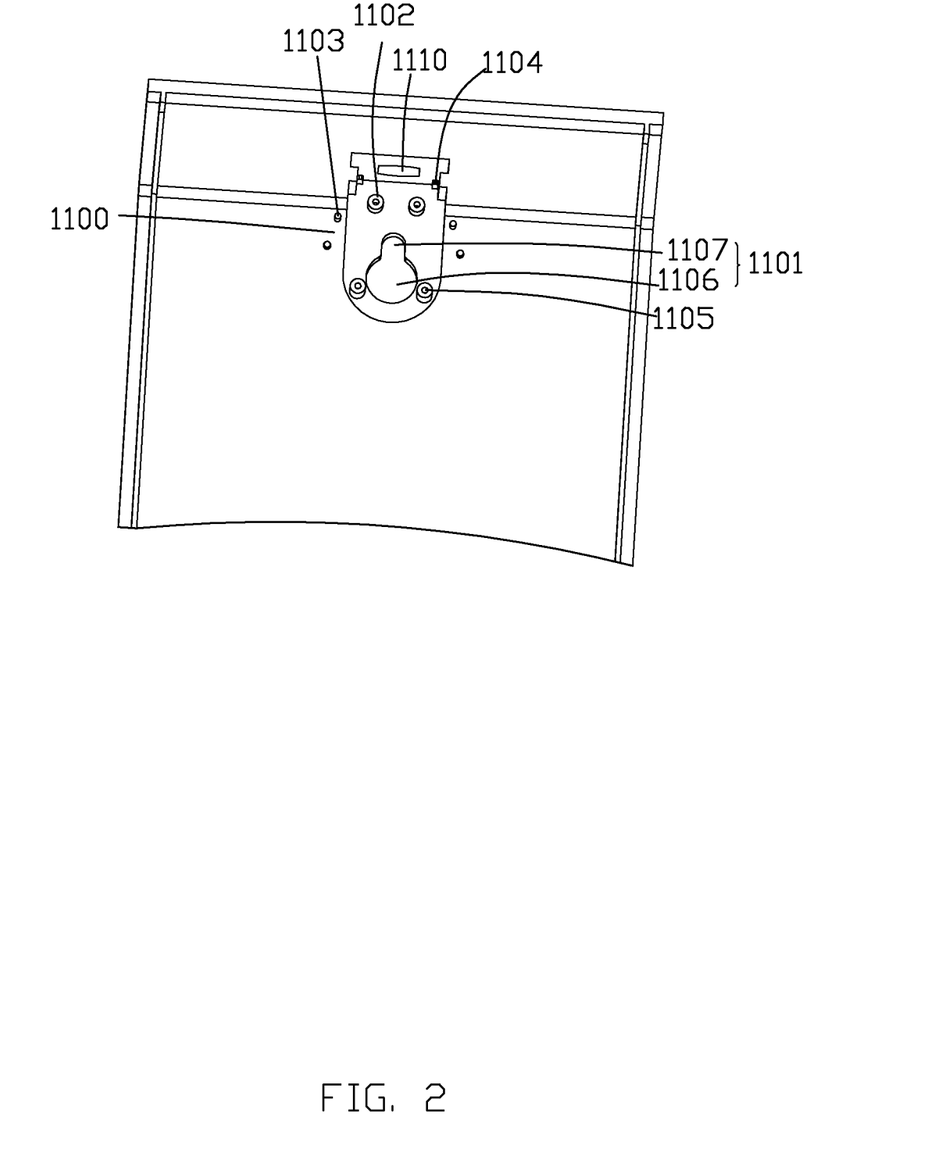
FIG. 2 is an isometric view of a position fixer of an enclosure of the electronic device of FIG. 1.

FIG. 1 and FIG. 2 show an electronic device 100. The electronic device 100 includes an enclosure 11 and a wall hanging lock 12 mounted on the enclosure 11.

The enclosure 11 includes a first sidewall 110 and a second sidewall 111 perpendicularly oriented to the first sidewall 110. A position fixer 1100 is located on the first sidewall 110. The position fixer 1100 includes a hanging hole 1101, a first positioning protrusion 1102 with a round hole 1105, a second positioning protrusion 1103, and a third positioning protrusion 1104.

The hanging hole 1101 is defined in the position fixer 1100 and is adjacent to the second sidewall 111. The hanging hole 1101 includes a first hole 1106 and a second hole 1107 in communication with the first hole 1106. A size of the first hole 1106 is larger than that of the second hole 1107, and the second hole 1107 is adjacent to the second sidewall 111. The first positioning protrusion 1102, the second positioning protrusion 1103 and the third positioning protrusion 1104 protrude from an inner side of the first sidewall 111 and surround the hanging hole 1106. The second sidewall 111 defines a keyhole 1110.

Figure 3:
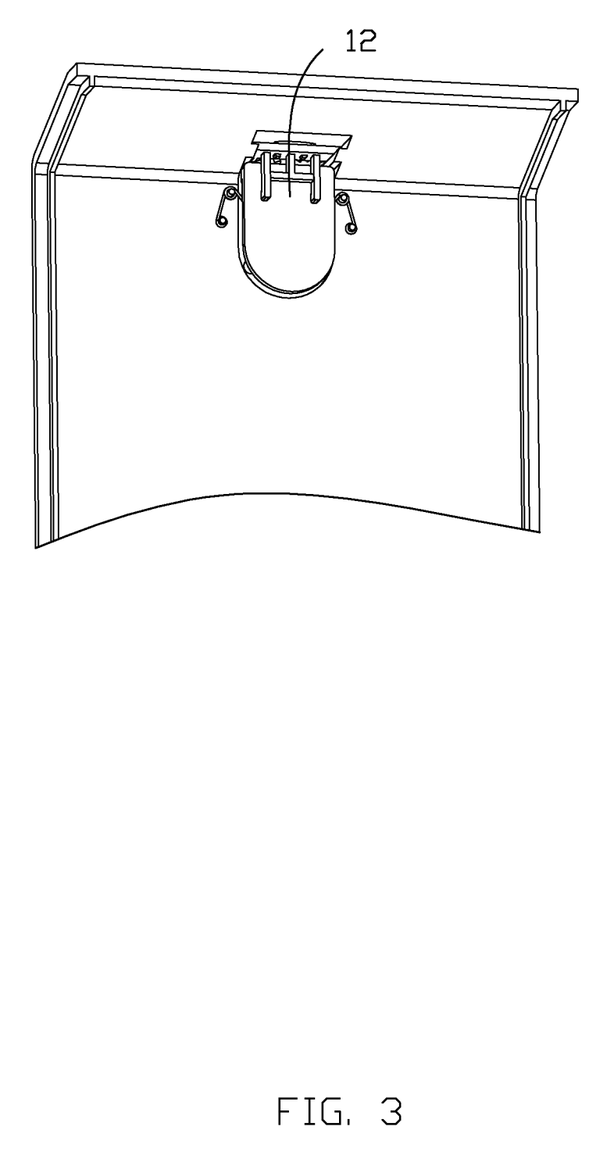
FIG. 3 is another isometric view of the position fixer of FIG. 2.
Figure 4:
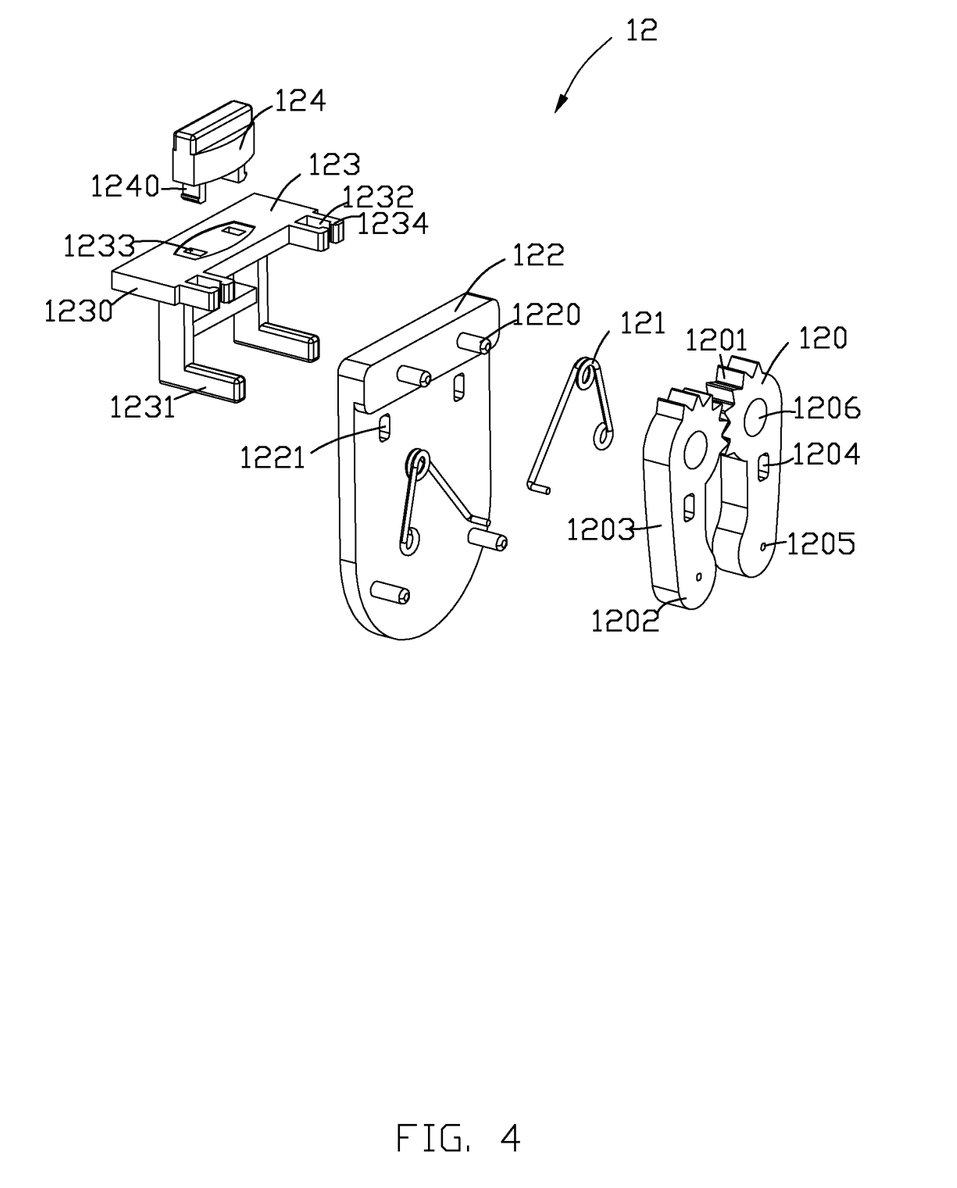
FIG. 4 is an exploded, isometric view of the wall hanging lock of FIG. 3.
Figure 5:
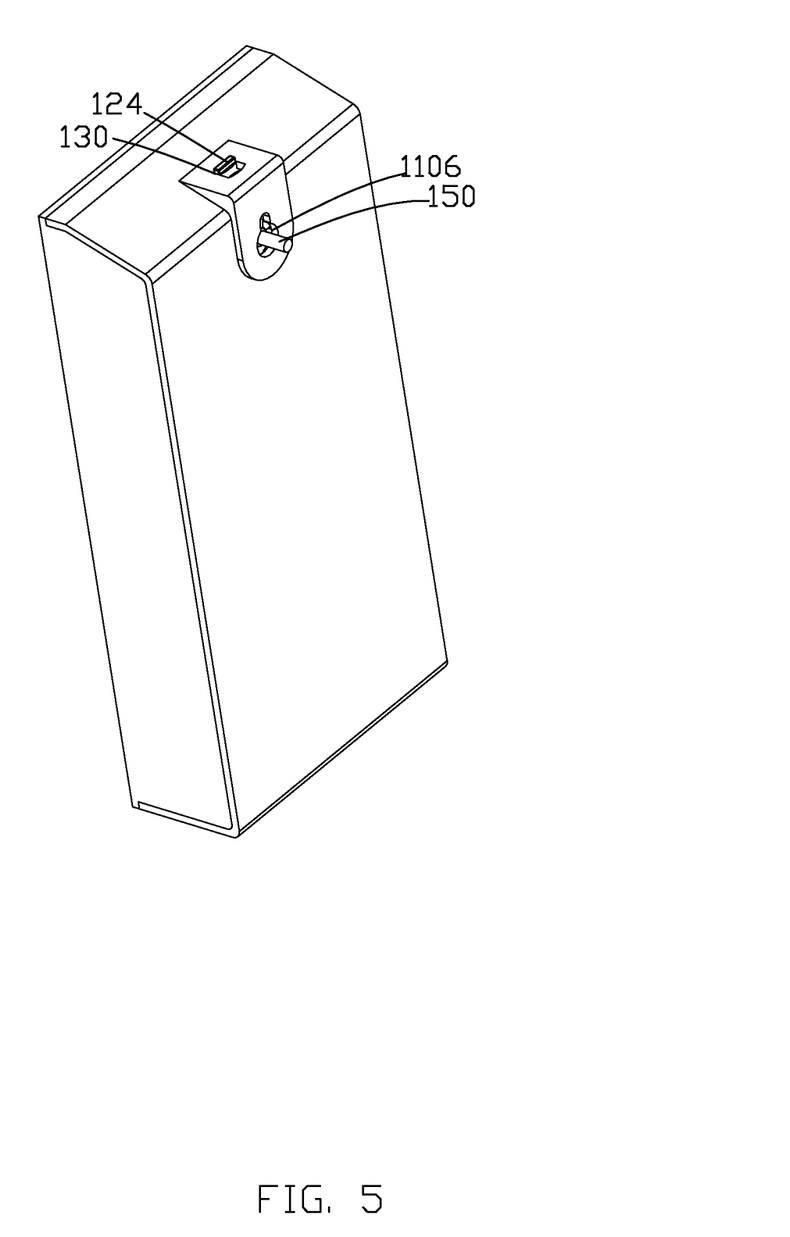
FIG. 5 is an isometric view of the electronic device of FIG. 1 hung on a screw.
Figure 6:
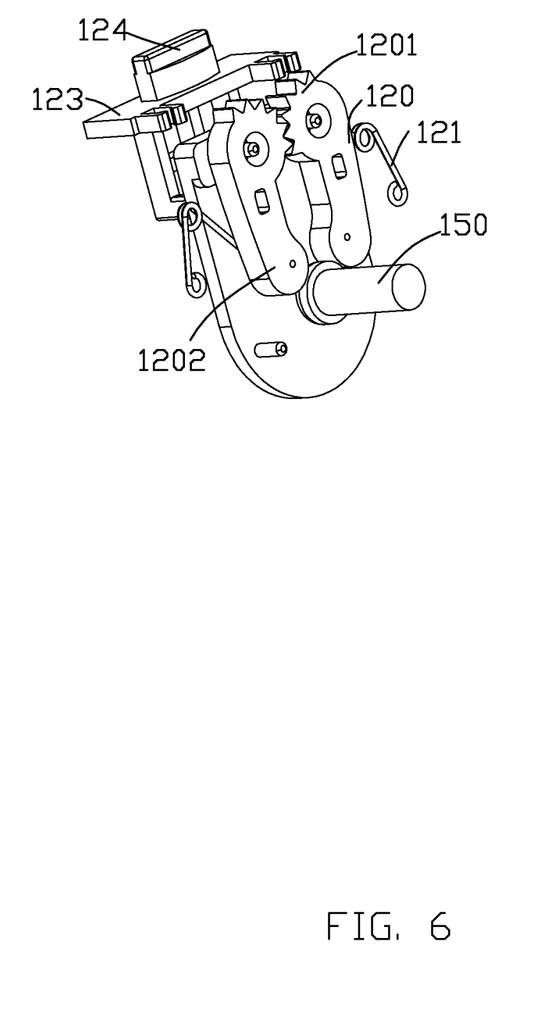
FIG. 6 is an isometric view of the wall hanging lock of FIG. 5 being unlocked.

FIG. 3 and FIG. 4 show the wall hanging lock 12 located at the position fixer 1100. The wall hanging lock 12 includes a pair of locking members 120 fixed on the first positioning protrusion 1102, a cover 122, a pair of torsion springs 121 located between the locking members 120 and the cover 122, a locking frame 123 extending through the cover 122 and the locking members 120, and a key 124 connected to the locking frame 123.

Each of the pair of locking members 120 includes a gear part 1201 with a plurality of teeth, and a stopper 1202 connected to the gear part 1201 by a connecting arm 1203. The connecting arm 1203 defines a first locking hole 1204. The stopper 1202 defines a mounting hole 1205. The gear part 1201 defines a first fixing hole 1206, and the first positioning protrusion 1102 extends through the first fixing hole 1206. An end of the torsion spring 121 is fastened on the second positioning protrusion 1103, and the other end of the torsion spring 121 is fixed in the mounting hole 1205.

The cover 122 includes a second locking hole 1221 corresponding to the first locking hole 1204, and a fixing posts 1220 extending through the round hole 1105.

The locking frame 123 includes a main body 1230, a pair of positioning legs 1231 perpendicularly extending from a side of the main body 1230, a pair of clamps 1232 engaged with the third positioning protrusion 1104 and a second fixing hole 1233 positioned at a central section of the main body 1230. The pair of clamps 1232 includes two opposite convex arc 1234. The key 124 includes a hook 1240 latched into the second fixing hole 1233.

In assembly, the pair of locking member 120 is fixed on the first positioning protrusion 1102 by the first fixing hole 1206, the teeth of the two gear parts 1201 being engaged with each other, and the two stoppers 1202 residing with each other. An end of the torsion spring 121 is fastened on the second positioning protrusion 1103, and the other end of the torsion spring 121 is fixed in the mounting hole 1205. The fixing posts 1220 is received in the round hole 1105 to fix the cover 122. The positioning legs 1231 are passed through the second locking hole 1221 and the first locking hole 1204. The hook 1240 of the key 124 is latched into the second fixing hole 1233.

FIG. 5-8 show that when the key 124 is in a unlocked position 130, the positioning legs 1231 are detached from the first locking hole 1204, and the stoppers 1202 are disengaged from each other. A fixing member 150 is set in the first hole 1106 and resists the stoppers 1202 of the locking members 120, and the gear parts 1201 being rotated relatively. In the embodiment, the fixing member 150 can be a screw.

Figure 7:
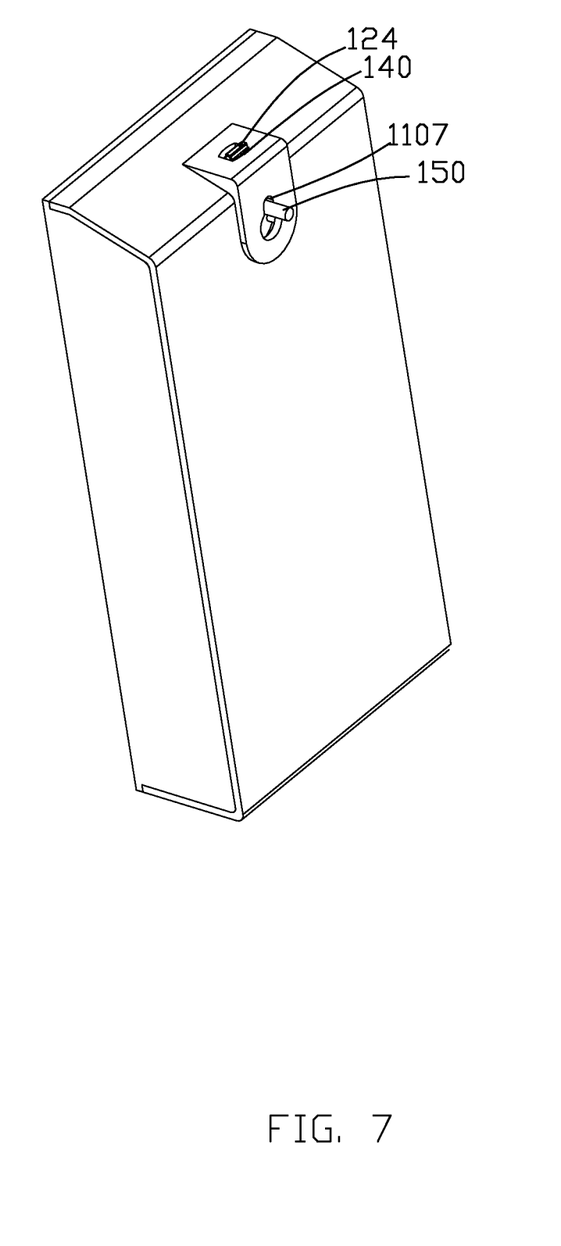
FIG. 7 is another isometric view of the electronic device of FIG. 1 hung on a screw.
Figure 8:
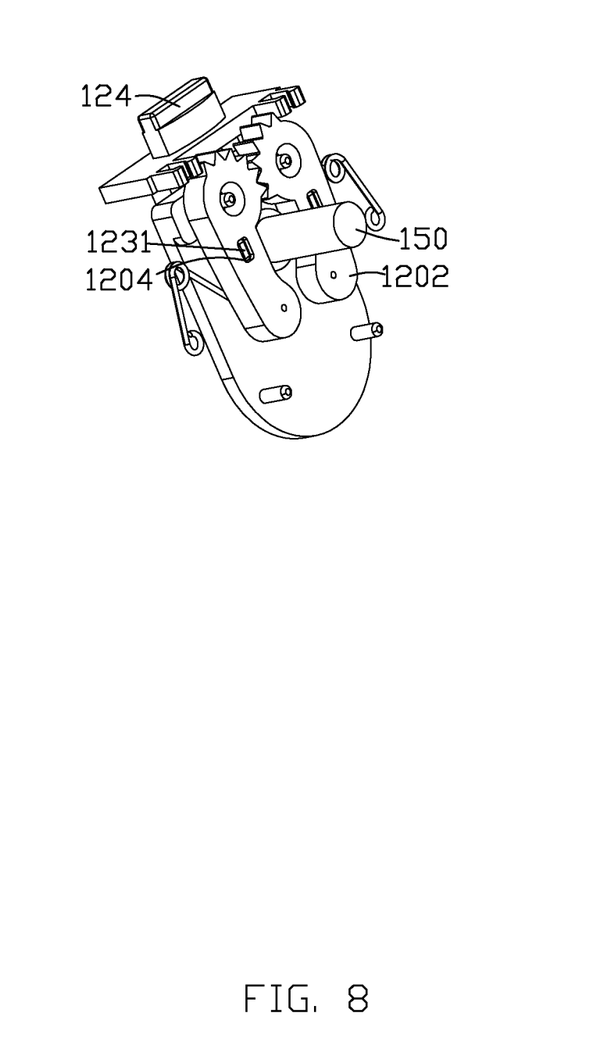
FIG. 8 is an isometric view of the wall hanging lock of FIG. 7 being locked on the screw.

The fixing member 150 is moved into the second hole 1107 and is positioned between the two connecting arm 1203. The key 124 is slid to a locked position 140, the positioning legs 1231 are inserted into the first locking hole 1204 to fix the locking members, and the fixing member 150 is clamped between the locking members 120. As a result, the electronic device 100 is firmly and securely hung on the fixing member 150.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A locking assembly for a wall-hanging electronic device comprising:
   an enclosure mountable to a wall-hanging electronic device and comprising a position fixer; and
   a wall hanging lock located at the position fixer; the wall hanging lock comprising:
   a pair of locking members; and
   a locking frame, the locking frame comprising a pair of positioning legs; when the positioning legs are inserted into the locking members, the locking members engage with each other for clamping a fixing member, the position legs being driven to detach from the locking member to loosen the fixing member.

2. The locking assembly of claim 1, wherein each locking member comprises a gear part, a stopper and a connecting arm connected between the gear part and the stopper, when the position legs are inserted into the locking members, the gear parts are engaged with each other, and the stopper of the locking members are engaged with each other; when the position legs are detached from the locking members, the stoppers of the locking members are disengaged from each other.

3. The locking assembly of claim 2, when the position legs are detached from the locking members, the gear parts are rotated with respect to each other to enable the stoppers to disengage from each other.

4. The locking assembly of claim 3, wherein each gear part comprises teeth, the teeth of the gear parts of the locking members are engaged with each other.

5. The locking assembly of claim 2, wherein the connecting arm defines a first locking hole, each leg is inserted into or detached from the first locking hole.

6. The locking assembly of claim 5, wherein the wall hanging lock further comprises a key connected with the locking frame and a pair of torsion springs, and an end of each torsion spring is fixed on the enclosure, another end of each torsion spring is fixed on the stopper.

7. The locking assembly of claim 6, wherein the locking frame further comprises a main body, the positioning legs perpendicularly extend from a side of the main body, the key is secured at another opposite side of the main body, sliding the key to make the positioning legs inserted into or detached from the first locking hole.

8. The locking assembly of claim 1, wherein the position fixer comprises a hanging hole and a plurality of positioning protrusions protruded from the position fixer, the positioning protrusions are located around the hanging hole, the wall hanging lock is secured on the positioning protrusions.

9. The locking assembly of claim 8, wherein the hanging hole comprises a first hole and a second hole communicating with the first hole, a size of the first hole is larger than that of the second hole, the fixing member is passed through the hanging hole.

10. An electronic device, being hung on a fixing member, the electronic device comprising:
    an enclosure; and
    a wall hanging lock; the wall hanging lock comprising:
    a locking frame, the locking frame comprising a pair of positioning legs;
    a pair of locking members, the positioning legs being inserted into the locking members to engage the locking members with each other to clamp onto the fixing member; the positioning legs being detached from the locking members to enable the locking members to be disengaged from each other to allow separation of the locking members from the fixing member.

11. The electronic device of claim 10, wherein each locking member comprises a gear part, a stopper connected and a connecting arm connected between the gear part and the stopper, when the position legs are inserted into the locking members, the gear parts are engaged with each other, and the stopper of the locking members are engaged with each other, when the position legs are detached from the locking members, the stoppers of the locking members are disengaged from each other.

12. The electronic device of claim 11, when the position legs are detached from the locking members, the gear parts are rotated with respect to each other to enable the stoppers to disengage from each other.

13. The electronic device of claim 12, wherein each gear part comprises teeth, the teeth of the gear parts of the locking members are engaged with each other.

14. The electronic device of claim 11, wherein the connecting arm defines a first locking hole, each leg is inserted into or detached from the first locking hole.

15. The electronic device of claim 14, wherein the wall hanging lock further comprises a key connected with the locking frame and a pair of torsion springs, and an end of each torsion spring is fixed on the enclosure, another end of each torsion spring is fixed on the stopper.

16. The electronic device of claim 15, wherein the locking frame further comprises a main body, the positioning legs perpendicularly extend from a side of the main body, the key is secured at another opposite side of the main body, sliding the key to make the positioning legs inserted into or detached from the first locking hole.

17. The electronic device claim 10, wherein the enclosure comprise a position fixer, the position fixer defines a hanging hole and a plurality of positioning protrusions protruded from the position fixer, the positioning protrusions are located around the hanging hole, the wall hanging lock is secured on the positioning protrusions.

18. The electronic device of claim 17, wherein the hanging hole comprises a first hole and a second hole communicating with the first hole, a size of the first hole is larger than that of the second hole, the fixing member is passed through the hanging hole.

* * * * *